United States Patent [19]

Hurley, Jr.

[11] 4,200,468

[45] Apr. 29, 1980

[54] GLAZE-FORMING COMPOSITION

[76] Inventor: Donald C. Hurley, Jr., 183 St. Joseph, Long Beach, Calif. 90803

[21] Appl. No.: 718,344

[22] Filed: Aug. 27, 1976

[51] Int. Cl.² ............................................. C03C 5/02
[52] U.S. Cl. ...................................... 106/48; 106/49
[58] Field of Search .................................. 106/48, 49

[56] References Cited

U.S. PATENT DOCUMENTS

| | | | |
|---|---|---|---|
| 2,208,034 | 7/1940 | Karach et al. | 106/48 |
| 2,389,386 | 11/1945 | Russell, Jr. | 106/48 |
| 3,230,283 | 1/1966 | Hughes | 106/48 |
| 3,898,091 | 8/1975 | Stout | 106/48 |

OTHER PUBLICATIONS

Lawrence, W. G., "Ceramic Science for the Potter", Chilton Book Company, 1972, pp. 44 and 82–91..

*Primary Examiner*—O. R. Vertiz
*Assistant Examiner*—Mark Bell

*Attorney, Agent, or Firm*—Poms, Smith, Lande & Rose

[57] ABSTRACT

A glaze-forming composition for producing a matured glaze on a ceramic clay body wherein the composition is a plastic, malleable, coherent mass, maturable into a glaze on the surface of the ceramic clay body upon firing, and bondable to an unfired clay body. The composition can be used by molding it onto the surface of an unfired ceramic clay body and firing the glaze-forming composition and ceramic clay body simultaneously. Alternatively, the glaze-forming composition may be applied to the clay body by forming a slip or slurry thereof in water, placing the slip on a non-porous surface in a decorative pattern, applying the surface of a plaster of paris body to the surface of the decorative pattern thereby transferring the decorative pattern to the surface of the plaster of paris, allowing said decorative pattern to dry and applying the surface of a green tile ceramic body to said decorative pattern thereby transferring said decorative pattern to said tile body. Thereafter, the tile body is fired to its maturing point.

5 Claims, No Drawings

GLAZE-FORMING COMPOSITION

BACKGROUND OF THE INVENTION

1. Field of the Invention

This invention relates to glaze-forming compositions for use with ceramic ware, particularly glaze-forming compositions that are malleable and plastic, and more particularly, glaze-forming compositions that are moldable onto an unfired ceramic clay body and bondable with an unfired clay body and capable of being fired and matured together with the ceramic clay body to thereby produce a glazed ceramic ware in one firing operation.

2. Description of the Prior Art

In the past, glaze-forming compositions have, in general, been liquids which have been applied to the surface of bisque fired ceramic clay bodies by painting, dipping, or spraying, which would be followed by a second firing operation. A few glazing processes provide for the application of the glaze-forming liquid to an unfired ceramic clay body which is then fired, thereby maturing both the glaze-forming liquid and the green ceramic clay body.

These compositions and processes have proved unsatisfactory; in fact, the potter and ceramic manufacturer are greatly constricted in their artistry and means of glazing by the fluid state of the glaze liquid. Being a liquid, the glaze-forming compositions, heretofore, naturally have a tendency to run or drip down the surfaces of the ceramic bodies, thereby preventing sharp and distinct coloring on the finished ceramic. It was also difficult to apply more than one glaze-forming composition at a time to the ceramic clay body without having the compositions run together.

In the light of the above limitations imposed upon potters by the liquid glaze-forming compositions, it has been a long desire to develop a glaze-forming composition that would be plastic and moldable by hand or machine to the surface of a ceramic clay body.

SUMMARY OF THE INVENTION

Accordingly, it is the primary object of this invention to provide a glaze-forming composition which is malleable and plastic.

Another object of this invention is to provide a plastic, malleable glaze-forming composition which can be molded, bonded, and matured on the surface of an unfired ceramic clay body.

A further object of the present invention is to disclose and provide a method or process for producing a highly decorative glazed ceramic ware, for example tile, by producing a plastic, malleable glaze-forming composition to which water is added to form a slip or slurry and applying two or more of these slips or slurrys, which are colored differently, to a non-porous surface to form a highly decorative pattern thereon, then applying a porous surface to said decorative pattern to transfer said decorative pattern to said non-porous surface, said porous surface removing a substantial portion of the water from said decorative pattern and thereafter applying a green unfired ceramic body to said porous body to transfer the decorative pattern from said porous body to said unfired clay body and thereafter firing said clay body to form a glaze body having a highly decorative surface.

Briefly, these and other objects of the invention are accomplished by providing a glaze-forming composition which is plastic, malleable, bondable to the surface of an unfired ceramic clay body, and capable of being matured in one firing with the unfired ceramic clay body. The essence of this invention is the modification of the conventional glaze-forming composition by increasing the clay content to provide the necessary plasticity; a minimum of 30% plastic clay being necessary and, in general, the amount of plastic clay in the glaze-forming composition will range from 30% to 50%, by weight. The particular plastic clay will preferrably have a relatively low alumina content so that the alumina content of the glaze-forming composition is not increased beyond that amount required for the glaze-forming composition at a particular temperature.

The process of this invention provides for the application of the plastic glaze-forming composition to either a preshaped unfired ceramic clay body or to an unshaped mass of ceramic clay for subsequent shaping and firing at one temperature to mature both the ceramic clay body and the glaze-forming composition to thereby form a glazed ceramic composition.

Another process of the present invention allows for producing highly decorative clay bodies by forming an aqueous slip or slurry from the plastic glaze-forming composition in varying colors, applying the slip or slurry in varying colors to a non-porous surface (e.g. steel) and thereafter applying a porous surface (e.g. plaster of paris) to the decorative pattern on the non-porous surface to transfer said decorative pattern from the non-porous surface to the porous surface. Because the surface is porous, the water from the decorative pattern is drawn up into the plaster of paris body and thereafter a green ceramic clay body is applied to the surface of the porous body to transfer the decorative pattern from the porous body to the unfired clay body (e.g. tile) which thereafter is fired to form a fired glazed tile having a particularly attractive decorative surface which cannot be duplicated by the prior art methods.

DETAILED DESCRIPTION OF THE INVENTION

This invention provides a new and useful glaze-forming composition that is plastic, malleable, bondable to the surface of an unfired ceramic clay body, and capable of being matured along with the ceramic clay body in one firing operation. Alternatively, the glaze-forming composition can be used as a slurry.

By plastic, it is meant that the composition has the property known as plasticity. Plasticity is that property of a material which allows it to retain its shape when no force is imparted to it, but will allow it to change its shape in response to a force applied to it. Clay, and particularly the clays used in making the glaze-forming compositions of the present invention, are plastic.

In general, glaze-forming compositions contain silica ($SiO_2$), alumina ($Al_2O_3$), and various fluxes (e.g. metal monoxides). In the instant invention, the molecular ratios of flux to alumina to silica will range from 1-0.3-2.2 to 1-1.1-7. The plastic glaze-forming composition can be used to as high as Cone 13 in which case, the molecular ratio would range from 1-1.1-7.1, but in general, it is preferred if the alumina content is not greater than 0.6 and the silica content is not greater than 4.5, that is to say, the molecular ratio would be 1-6-4.5.

The higher the cone, the greater the amount of alumina that is permissable in the clay because the higher the cone, the greater the amount of alumina can be present. Thus, for example, at Cone 13, the molecular ratio of flux to alumina is 1–1.1 indicating that if a clay is present in an amount of 35%, the clay could contain about 35% alumina. However, in general, in glazes for use on ceramics of Cone 10 or less, the amount of alumina present should be 30% and preferrably 25%, by weight, or less.

As is known in the art, the term glaze indicates a thin coating on the surface of a clay body for the purpose of rendering the clay body impervious to moisture as well as providing a smooth, non-porous surface over the surface of the relatively rough, porous ceramic clay body.

As noted above, after firing, the present glazes are similar to those glazes found in the prior art, the primary difference being the fact that more decorative patterns can be produced by the glazes of the present invention. The various constituents of the glazes and their amounts set out molecularly have been indicated above. Such glazes can, in general, be formed by utilizing feldspar, a ball clay containing preferably less than 25% alumina, silica, and, if necessary, flux. In this regard, it should be noted, that fluxes of the present invention are those conventionally used in the making of glazes and include, in particular, $PbO$, $Na_2O$, $K_2O$, $CaO$, $MgO$, $BaO$, $Li_2O$, $SrO$, $B_2O_3$, and $ZnO$, among others. A principal function of the presence of these fluxes is to decrease the melting temperature of the silica in the glaze-forming composition.

In general, the amount of the various constituents, in order to produce the molecular ratios indicated above, can vary greatly and will include 30% to 50%, by weight, of clay with varying amounts of feldspar (e.g. from 5% to 20% in the case of a Cone 13 body) and the addition of some silica, depending upon the amount of feldspar and the amount of silica in the clay.

The ingredients of the above-described compositions are admixed in any conventional manner and result in a plastic, malleable, coherent mass that is capable of being molded and bonded onto the surface of an unfired ceramic clay body.

Typically, the glaze-forming composition will be applied to the surface of a previously shaped unfired ceramic clay body. Because the unfired ceramic clay body is itself plastic and malleable, it is preferred that the glaze-forming composition be more malleable than the clay body so that the shape of the clay body is not destroyed during the application of the glaze-forming composition.

Because of the higher clay content of the glaze-forming compositions of this invention, they are easily bondable with and adhere to the surface of the unfired ceramic clay body. This will produce a ceramic ware with a strong permanent glaze integral with it.

It is preferred that the glaze-forming composition be constituted so that it will properly mature in the same firing step as the green ceramic clay body, considering the firing conditions such as time and temperature. This can be conventionally accomplished by those skilled in the art.

The following is an example of the preparation and use of a glaze-forming composition of this invention. First, a Cone 12 clay body is conventionally prepared from an admixture of 40 weight percent Kaolin, 20 weight percent Gairome clay, 12 weight percent China stone, 18 weight percent granite, and 10 weight percent Kira clay. Then a Cone 12 glaze body is prepared from an admixture containing 30 weight percent feldspar having an alumina content of 18 weight percent, 35 weight percent of Gairome clay having an alumina content of 38 weight percent, 25 weight percent silica, 8 weight percent lime, and 2 weight percent zinc oxide. This composition will have a flux to alumina to silica ratio of 1–1.13–7.07.

The resulting glaze-forming composition is a plastic, malleable coherent mass which is more malleable than the green ceramic clay body, is bondable to the ceramic clay body, and whose conditions for maturing are approximately equal to that of the green ceramic clay body.

Such a glaze-forming composition indicated above may be applied to the green ceramic clay body by first molding the ceramic clay body into its desired shape and pressing a sheet of said glaze-forming composition onto at least one surface of the unfired clay body. Alternatively, the glaze-forming composition may be applied to an unshaped ceramic clay body and then pressed thereon to form a shaped body, or the clay body may be placed into a mold and the glaze-forming composition placed on top and the resulting mixture shaped into the desired form. In any event, the unitary mass consisting of the green clay body with at least one layer thereon of the glaze-forming composition is fired and matured in one operation, resulting in a glazed ceramic ware.

However, in addition to the foregoing methods of applying the glaze-forming composition to a green clay ceramic body, the glaze-forming composition may be made into a slurry or slip by the addition of an appropriate amount of water thereto. In general, a number of slips or slurries will be made, composed of numerous different colors. These varied-colored slips will then be applied to a non-porous surface such as a flat steel plate so that a decorative pattern is produced thereon. Thereafter, a porous surface (for example, a plaster of paris body) is applied to the decorative pattern on the steel sheet and because the plaster of paris is porous, the decorative body will adhere to the plaster of paris body and be removed from the steel sheet. in addition, because of the porosity of the plaster of paris, the water from the decorative pattern (which is a slurry of the glaze-forming composition of this invention is removed and the decorative pattern can then be transferred to a ceramic body, such as a tile, by merely placing the tile on the decorative pattern which is on the surface of the plaster of paris body. The tile may be then fired in a normal manner in one firing. Such a process provides a decorative tile or ceramic body which is not possible by prior art methods.

In order to make a plastic glaze-forming composition usable on a Cone 04 ceramic body, the following constituents are intimately admixed in the following percentages: white lead 47.8%; Jordan clay, 33%, feldspar, 7%; calcium carbonate, 7.2%; and silica, 5%. The molecular ratio of flux to alumina to silica in such a composition is 1–.33–2.21. The Jordan clay utilized in this composition contains 0.2% $K_2O$, 0.23% $Na_2O$, 0.16% $CaO$, 20.2% $Al_2O_3$ and 67.2% $SiO_2$. An 04 cone plastic glaze is about the lower limit for glazes made in accordance with the present invention thus, this invention is applicable from Cone 04 to Cone 13.

In order to prepare a Cone 4 plastic glaze, an admixture is made of the following components: 5% feldspar, 35% Jordan clay, 22% silica, 26% white lead, and 12calcium carbonate. Such a composition has the following molecular ratio of flux to $Al_2O_3$ to silica; 1–0.35–3.5.

In order to make a Cone 9 plastic glaze, the following components are formed into an intimate admixture: 40% Jordan clay, 20% feldspar, 20% silica, and 20% calcium carbonate. Such a composition has a flux to alumina to silica ratio of 1–0.52–4.3.

The above examples are merely exemplary and those skilled in the art will appreciate that the various ingredients and components can be varied or modified to suit the green ceramic clay body used and the desired appearance of the ceramic ware and within the specified limits in the claims.

I claim:

1. A glaze-forming composition for producing a matured glaze on a ceramic clay body, said glaze-forming composition being a plastic, malleable, coherent mass which is moldable onto an unfired ceramic clay body and maturable into a glaze on the surface of said unfired ceramic clay body upon firing, and is bondable to said unfired ceramic clay body, said glaze-forming composition consisting essentially of plastic clay, a glaze flux, alumina, and silica, at least a portion of the alumina and silica being derived from the clay, the amount of clay in said glaze-forming composition being at least 30%, by weight, the molecular ratio of flux to alumina to silica, including the alumina and silica in the plastic clay, being from 1–.3–2.2 to 1–1.1–7.

2. A glaze-forming composition according to claim 1 wherein the clay is a ball clay and contains not greater than 30%, by weight, of alumina.

3. A glaze-forming composition according to claim 2 wherein the ball clay contains not greater than 25%, by weight, of alumina.

4. A glaze-forming composition according to claim 1 wherein the glaze flux is a metal monoxide.

5. A glaze-forming composition for producing a matured glaze on a ceramic body, said glaze-forming composition being a plastic, malleable, coherent mass which is moldable onto an unfired ceramic clay body and maturable into a glaze on the surface of said unfired ceramic clay body upon firing, and is bondable to said unfired ceramic clay body and is more malleable than said unfired clay body, said glaze-forming composition consisting essentially of a plastic ball clay containing less than 30%, by weight, of alumina, a metal monoxide glaze flux, alumina, and silica, at least a portion of the alumina and silica being derived from said ball clay, the amount of said ball clay in said glaze-forming composition being between 30% and 50%, by weight, the molecular ratio of flux to alumina to silica, including the alumina and silica in the plastic clay, being from 1–0.3–2.2 to 1–1.1–7.

* * * * *